United States Patent
Watson et al.

(10) Patent No.: US 8,599,008 B2
(45) Date of Patent: Dec. 3, 2013

(54) APPLIANCE MONITORING SYSTEM AND METHOD

(75) Inventors: Eric K. Watson, Crestwood, KY (US); Timothy A. Hamel, Ashville, NC (US); Richard DeVos, Goshen, KY (US); Natarajan Venkatakrishnan, Louisville, KY (US); Charles Dawes, Long Beach, CA (US); Michael Kello, Louisville, KY (US); Rajendra Prasad Gottipati, Hyderabad (IN); Donald Ganiere, Ottawa, IL (US); Steven Keith Root, Buckner, KY (US)

(73) Assignee: General Electric Company, Schenectady, NY (US)

( * ) Notice: Subject to any disclaimer, the term of this patent is extended or adjusted under 35 U.S.C. 154(b) by 374 days.

(21) Appl. No.: 12/843,300

(22) Filed: Jul. 26, 2010

(65) Prior Publication Data

US 2012/0019378 A1    Jan. 26, 2012

(51) Int. Cl.
*G08B 1/08* (2006.01)
(52) U.S. Cl.
USPC .......... 340/539.1; 340/539.13; 340/618; 340/679; 340/870.17; 340/10.2; 340/5.1; 340/5.6; 700/276; 700/286; 700/295; 700/296
(58) Field of Classification Search
USPC .......... 340/539.1, 539.13, 618, 679, 870.17, 340/10.2, 5.1, 5.6; 700/276, 286, 295, 296
See application file for complete search history.

(56) References Cited

U.S. PATENT DOCUMENTS

| | | | |
|---|---|---|---|
| 5,546,379 A | 8/1996 | Thaweethai | |
| 5,909,183 A | 6/1999 | Borgstahl et al. | |
| 5,987,105 A * | 11/1999 | Jenkins et al. | 379/106.01 |
| 6,772,096 B2 | 8/2004 | Murakami et al. | |
| 6,870,480 B2 * | 3/2005 | Suzuki et al. | 340/679 |
| 6,906,617 B1 * | 6/2005 | Van der Meulen | 340/538 |
| 6,990,335 B1 | 1/2006 | Shamoon et al. | |
| 8,432,291 B2 * | 4/2013 | Han et al. | 340/679 |
| 2001/0025349 A1 | 9/2001 | Sharwood et al. | |
| 2002/0095269 A1 | 7/2002 | Natalini et al. | |
| 2002/0130652 A1 | 9/2002 | Bessler | |
| 2003/0167785 A1 | 9/2003 | Roh et al. | |
| 2008/0047287 A1 | 2/2008 | Ruppert | |
| 2008/0231468 A1 * | 9/2008 | Myllymaki | 340/870.17 |

(Continued)

FOREIGN PATENT DOCUMENTS

| | | |
|---|---|---|
| JP | 2002295939 A2 | 10/2002 |
| WO | 2005/108942 A1 | 11/2005 |

OTHER PUBLICATIONS

Search Report issued in connection with EP Application No. 11174206.0, Oct. 11, 2011.

(Continued)

*Primary Examiner* — Tai T Nguyen
(74) *Attorney, Agent, or Firm* — Global Patent Operation; Douglas D. Zhang (57) ABSTRACT

A method and system for monitoring an appliance is disclosed. The method includes establishing a wireless communication connection between a communication module in an appliance and a communication network, transmitting operational data in real-time from the appliance to an external monitoring system over the communication network, determining a status of a component of the appliance from the real-time operational data, and if a failure mode of the component is detected, initiating a service protocol corresponding to the component.

18 Claims, 4 Drawing Sheets

(56) References Cited

U.S. PATENT DOCUMENTS

| | | | |
|---|---|---|---|
| 2009/0100132 A1* | 4/2009 | Ebrom et al. | 709/203 |
| 2011/0074589 A1* | 3/2011 | Han et al. | 340/618 |
| 2011/0202910 A1* | 8/2011 | Venkatakrishnan et al. | 717/171 |

OTHER PUBLICATIONS

Rupert Goodwins, LG GR-D267DTU Internet Refrigerator, LG Refrigerators—CNET Asia, (http://asia.cnet.com/reviews/pcperipherals/0,39051168,39099200.00.htm).

K. F. Eustice, et al., A Universal Information Appliance, IBM Systems Journal, vol. 38, Issue 4, Dec. 1999, pp. 575-601, IBM Corp., Riverton, NJ USA.

M. Rahman, et al., Remote Access and Networked Appliance Control Using Biometrics Features, IEEE Transactions on Consumer Electronics Journal, vol. 49, Issue 2, May 2003, pp. 348-353, IEEE Press, Piscataway, NJ USA.

\* cited by examiner

APPLIANCE MONITORING SYSTEM AND METHOD

BACKGROUND OF THE INVENTION

The aspects of the disclosed embodiments generally relate to appliances. More particularly, the aspects of the disclosed embodiments relate to remotely monitoring appliance operational data in real-time.

One example of a conventional remote maintenance system for an appliance is described in U.S. Pat. No. 6,772,096. This type of system generally includes a server located in the home (home server) and is connected to a service center server. The appliance includes a monitoring circuit that monitors an internal state of the appliance. The internal state is reported to the home server, which sends the information on to the center server. The center server holds a failure decision model for the appliance that determines a failure of the appliance.

The home server can also hold a failure decision model corresponding to the appliance model. The home server can detect a failure of the appliance and notify the center server of the failure.

However, in these types of systems, a home server is required to acquire the internal state of the appliance. The internal state data is collected in the home server. The home server must then arrange for the internal state data to be transmitted to the central server, where the data is compared with a failure model to determine if the appliance is in a failure state.

It would be advantageous to be able to automatically couple an appliance to the Internet over a user's wireless local area network (WLAN) in order to transmit real-time operating data of the appliance to a service center or user. It would also be advantageous to be able to use the real-time data to determine a failure or pre-failure mode of the appliance in order to address repair issues prior to a catastrophic failure of the appliance.

BRIEF DESCRIPTION OF THE INVENTION

As described herein, the exemplar), embodiments overcome one or more of the above or other disadvantages known in the art.

One aspect of the exemplary embodiments relates to a method of monitoring an appliance that includes establishing a wireless communication connection between a communication module in an appliance and a communication network, transmitting operational data in real-time from the appliance to an external monitoring system over the communication network, determining a status of a component of the appliance from the real-time operational data, and if a failure mode of the component is detected, initiating a service protocol corresponding to the component.

Another aspect of the exemplary embodiments relates to an appliance monitoring system that includes an appliance, a communication module coupled to the appliance, a local area network in communicative proximity to the communication module, wherein the communication module is configured to be communicatively coupled to the local area network. The local area network is configured to enable communications from the appliance via the Internet, and a service center is communicatively coupled to the local area network via the Internet. The service center is configured to receive operational data from the appliance in real-time.

These and other aspects and advantages of the exemplary embodiments will become apparent from the following detailed description considered in conjunction with the accompanying drawings. It is to be understood however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE INVENTION

Figure 1:
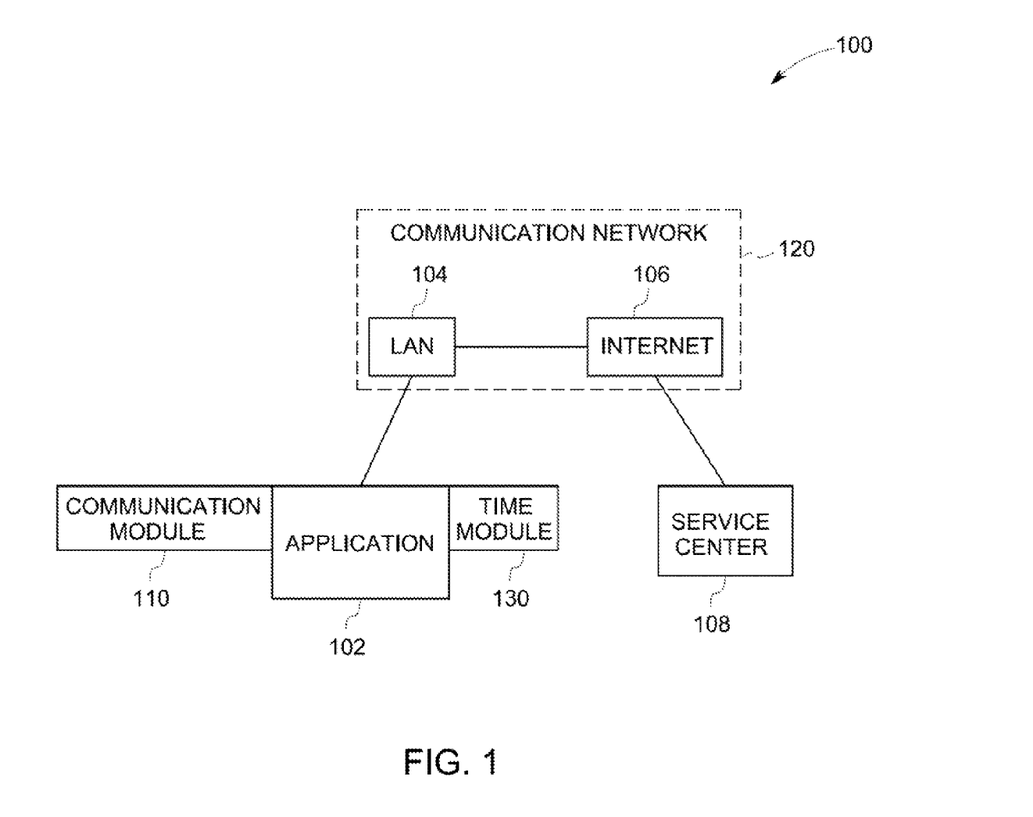
FIG. 1 is a block diagram of a system incorporating aspects of the disclosed embodiments.

FIG. 1 illustrates a block diagram of a system incorporating aspects of the disclosed embodiments. As can be seen in FIG. 1, an appliance 102 is communicatively coupled to a service center 108 via a communication network 120. The appliance 102 is configured to transmit data in real-time corresponding to the operation and operational components ("operational data") of the appliance 102 to the service center 108. The real-time operational data can be collected and analyzed at the service center 108 for, inter alia, failure analysis and diagnostics, appliance performance tracking, operational and diagnostic feedback, and generating alarms.

In one embodiment, the appliance 102 is communicatively coupled to a local area network (LAN) 104, such as for example, a wireless local area network (WLAN). The local area network 104 will typically be the users local or home network. The appliance 102 will generally be in communicative proximity to the local area network 104 to enable the communication connection. In alternate embodiments, the appliance 102 and local area network 104 can be suitably located to allow the appliance 102 to wirelessly connect to the local area network 104.

In one embodiment, the appliance 102 includes a communication module 110, such as a wireless communication controller, for example. The communication module 110 is generally configured to establish a wireless communication connection or link between the appliance 102 and the local area network 104. In one embodiment, the communication module 110 is a wireless access point device.

In a manner generally understood in the art, in one embodiment, the appliance 102 is configured to automatically establish a communication connection or link with the local area network 104. This could occur on power-up of the appliance 102, or at any suitable time. Once the communication link is established, the appliance 102 can begin communicating with the service center 108. As shown in FIG. 1, the local network 104 is connected to the communication network 106. In one embodiment the communication network 106 is the Internet. In alternate embodiments, the communication network 106 can be any suitable communication network that enables the exchange of data between the appliance 102 and the service center 108, other than including the Internet. For example, in one embodiment, the communication network 106 is a mobile communication network.

Once the communication connection is established, the appliance 102 is configured to automatically transmit the real-time data related to the operation, and operational components of the appliance 102 to the service center 108. The operational components of the appliance 102 can generally include any part or device of the appliance 102 that has a functional effect on the operation of the appliance 102. For example, where the appliance 102 is a refrigerator, the operational components can include, but are not limited to, doors, lights, power supply and usage monitors, temperature sensors, compressors, fans, circuit boards, run time detection modules, and water flow monitors. Where the appliance 102 is a range or oven, the operational components can include, but are not limited to, doors, temperature sensors, burners and elements, gas flow sensors, power supply and usage monitors, cooking cycle controllers, cooktop temperature monitors and ignition sensors. The above lists are merely exemplary and are not intended to include all components of an appliance 102 that can have an effect on the functioning and performance of the appliance 102. In one embodiment, each component will be coupled to a suitable sensor, transducer or other data-collecting device that enables the collection and transmission of the operational data for the particular component.

The aspects of the disclosed embodiments not only monitor the function and performance of the individual components of an appliance 102, but can also monitor usage aspects of the individual components. For example, in one embodiment, the aspects of the disclosed embodiments can monitor the number of times a door of the appliance 102 is opened and closed within a given time period, or monitor a length of time the door is open. This can be particularly useful with respect to a refrigerator or freezer unit, where the number of door openings and the length of an open door condition will have an effect on temperature control. When the appliance is a range, the length of time a burner is activated can be monitored. This can be useful for determining whether a burner is inadvertently left on. Such operational information and data can be used to provide alerts to the user of the appliance 102 to take corrective action.

In one embodiment, the communication module 110 is configured to receive the real-time operational data from one or more of the operational components of the appliance 102. The data can automatically be propagated to the communication module 110, or, in one embodiment the communication module 110 can poll each component for updated operational data. Each operational component of the appliance 102 can include one or more devices that are used to collect and transmit the data to the wireless communication controller 110.

In one embodiment, the real-time operational data from the appliance 102 is transmitted from the wireless network 104 over the communication network 106 to the external service center 108. The real-time operation data can be transmitted at any suitable time interval, or upon request. For example, in one embodiment, the real-time operational data is updated or transmitted hourly. In another embodiment, a request from the service center 108 for data prompts the appliance 102 to transmit the data.

For example, in one embodiment, the service center 108 is configured to send a message or connect to the appliance 102 using the Media Access Control address ("MAC") of the appliance 102. The service center 108 can initiate the communication connection and data transfer with a specific appliance 102. In this manner, the service center 108 can selectively evaluate individual appliances 102 or groups of appliances 102 for Maintenance issues or other diagnostic queries.

In one embodiment, when the data is received in the service center 108, the data is time-stamped, logged, stored and analyzed. If the real-time data indicates a failure mode of one of the components of the appliance 102, a corresponding service or repair protocol can be initiated.

A failure mode of a component can be any indication that the operation of the component is or could have an adverse or undesired effect on the operational aspects of the appliance. For example, if the component is a door, and the data indicates that the door has been open for an extended period of time, in one embodiment, the repair or service protocol could include notifying the user of the open door condition. This notification could include, for example, a telephone call to the user, an electronic mail message a text message over a cellular communication network, or the activation of an alarm on the appliance 102. The alarm on the appliance 102 could include for example an audible warning and/or providing an alert message on a message center of the appliance 102. In alternate embodiments, the notification can be provided in any suitable manner. As another example, where the appliance 102 is a refrigeration or freezer unit, the operational data can include compressor run-time and compartment temperature data. If for example, the data indicates compressor run-times that exceed pre-determined limits, or variations, without corresponding compartment temperature changes this could be indicative of a compressor seal failure. In such a situation, a service or repair protocol can include, an automatically initiated service call, even before the component suffers a catastrophic failure or the user is aware of any problem with the appliance 102. A catastrophic failure in this situation might be one where the compartment temperature of the refrigerator rises to a point resulting in food spoilage. Where the appliance 102 is a washer/dryer unit, the operational information could include diagnostics related to temperature. If a temperature in a dryer exceeds a pre-determined value, this could be indicative of a potential unsafe condition or other hazardous situation. Filtering of the diagnostic and operational parameters can be used to generate alarms. Depending upon the situation, the alarms can be local to the appliance 102, such as on a message center of the appliance 102, sent directly to the user, or in the case of a potentially hazardous situation, to a suitable emergency responder. Thus, the aspects of the disclosed embodiments allow a potential failure of an appliance 102 to be detected prior to any degradation in performance or failure of, or related to, the appliance 102.

In one embodiment, the operational data, or a status of the operation of the appliance 102 can be provided to the user in the form of a notification or an alert. For example, if the appliance 102 has completed a particular operational cycle, such as a cooking or cleaning cycle, this data can be provided to the user. In one embodiment, the data can be provided to the user in the form of an electronic mail or short message service message. In alternate embodiments, the status data can be provided to the user in any suitable fashion.

The operational data can also be used by the service center 108 to track the appliance performance over time. In one embodiment, the appliance performance can be compared to historical and/or statistical performance models to evaluate the current operation of the appliance 102 as compared to its prior operational performance. This type of evaluation and study can be useful for predictive failure analysis of the appliance 102. As another example, in one embodiment, the real-time data transmitted by the appliance 102 to the service center 108 can be collected and analyzed to determine use, behavior and performance patterns for the appliance 102. These patterns can then be used for future device design and development, or energy usage monitoring, for example.

In one embodiment, the service center 108 is configured to perform basic diagnostic analysis of the appliance 102. The diagnostics can be performed over the Internet connection between the appliance 102 and the service center 108. In one embodiment, the diagnostic information can be used by the service center 108 to attempt repairs over the Internet, such as by software updates for the appliance 102. Alternatively, the user of the appliance 102 can be provided with diagnostic feedback related to the operation of the appliance 102. This can be advantageous in allowing the user to determine a general health and condition of the appliance 102, particularly with respect to deciding whether to effect repairs of the appliance 102 or purchase a new appliance.

The connection of the appliance 102 to the Internet can also allow the user to use the appliance 102 as a means for communicating and accessing data over the Internet. In one embodiment, where the appliance 102 has a suitably configured user interface, such as a keypad and display, the user can use the appliance 102 to access content from the Internet. In addition to content related to the appliance 102, the user could access information such as, but not limited to, new and entertainment information, weather forecasts and alerts, traffic, cooking information, search tools, email and streaming media.

The Internet connection to the appliance 102 can also be used to provide Voice over Internet Protocol ("VOIP") communications using the appliance 102. As an example, this could enable a service technician to communicate directly with a user of the appliance 102 over the VOIP connection as an additional diagnostic or repair capability.

Figure 2:
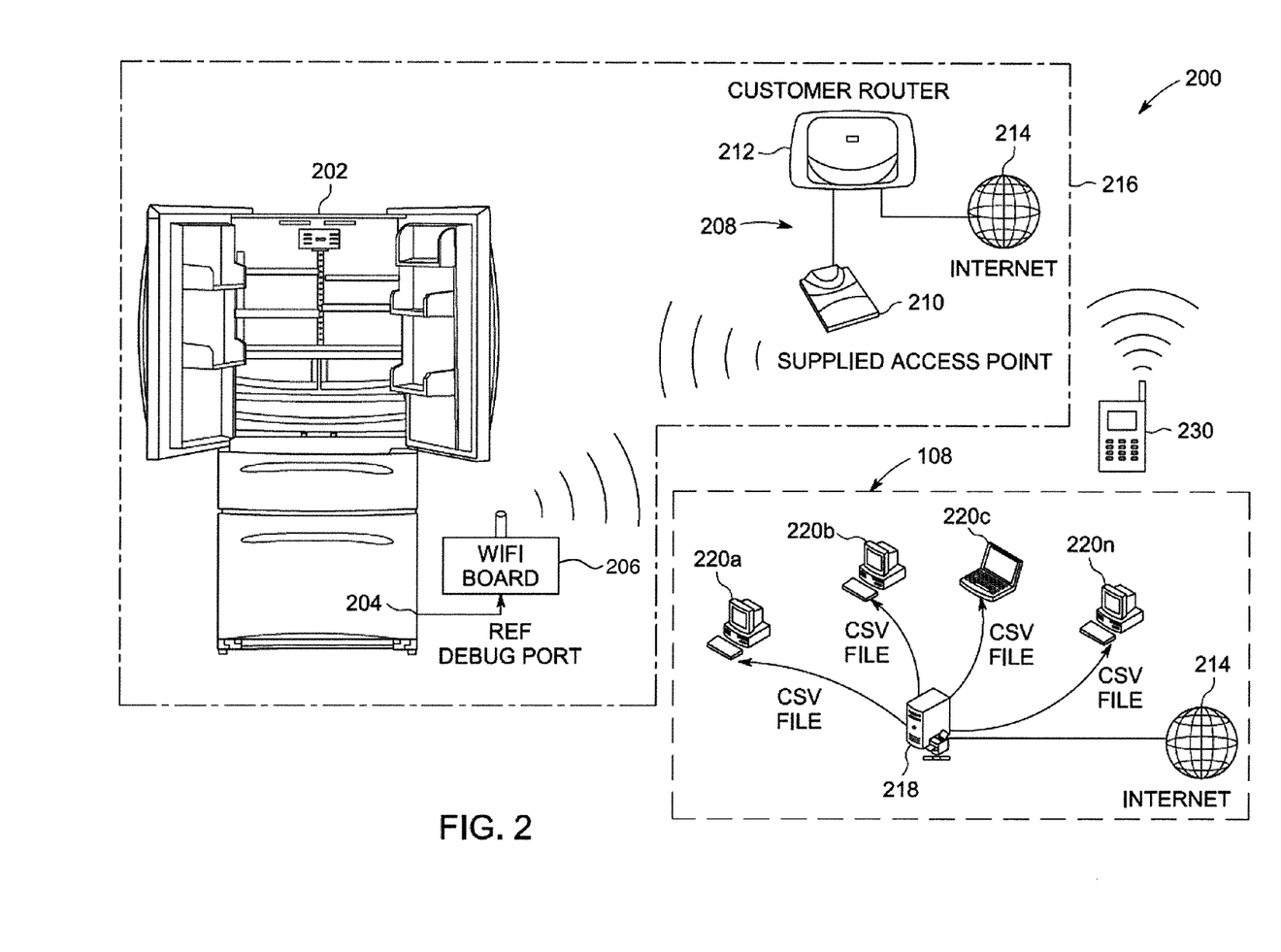
FIG. 2 is a block diagram of an exemplary system incorporating aspects of the disclosed embodiments.

FIG. 2 illustrates another example of a system 200 incorporating aspects of the disclosed embodiments. In this example, the appliance 102 is a refrigerator 202. The refrigerator 202 is connected to the Internet 214 within the home environment 216.

In this embodiment, the refrigerator includes a port 204 that provides a connection point for connecting a wireless access point device 206. The wireless access point device 206 can be internal or external to the refrigerator 202. The system 200 also includes a wireless local area network 208. The wireless local area network includes wireless access point device 210 that is coupled to a router 212. The router 212 is configured to establish a communication connection to the Internet 214.

The system 200 is configured to be connected, via the Internet 214, to a service center 108. The service center 108 is generally an operational center or similar system that is configured to collect the real-time data from the appliance 102 and interpret the data. The data can be used for predictive failure analysis, diagnostic testing, usage determination, performance evaluations and design analysis, for example. In alternate embodiments, the data can be used for any suitable purposes.

In one embodiment, the appliance 102 can also be configured to remotely communicate with a user's communication device or system 230. For example, the appliance 102 can be configured to transmit data to, as well as receive certain operational commands from, an external device 230, such as a computer or a smart phone. In this situation, the user can monitor the status of the appliance, and remotely send commands to the appliance 102 to control the appliance. For example, where the appliance 102 is a air conditioner, the user could remotely transmit a command, using for example a smart phone 230, that turns the air conditioner on or off, adjusts a temperature of the air conditioner or a sets a cooling cycle of the air conditioner.

The service center 108 can also include a server 218, which is connected to one or more clients 220a-220n. In one embodiment, the server 218 is configured to receive data sent from the refrigerator 202 in a hypertext transfer protocol ("HTTP") and store the data in a database system. Once the server 218 receives the data, the data can be retrieved via any one or more of the clients 220a-220n. In one embodiment, the data is formatted in a comma separated value ("CSV") format. In alternate embodiments, any suitable format can be used.

Figure 3:
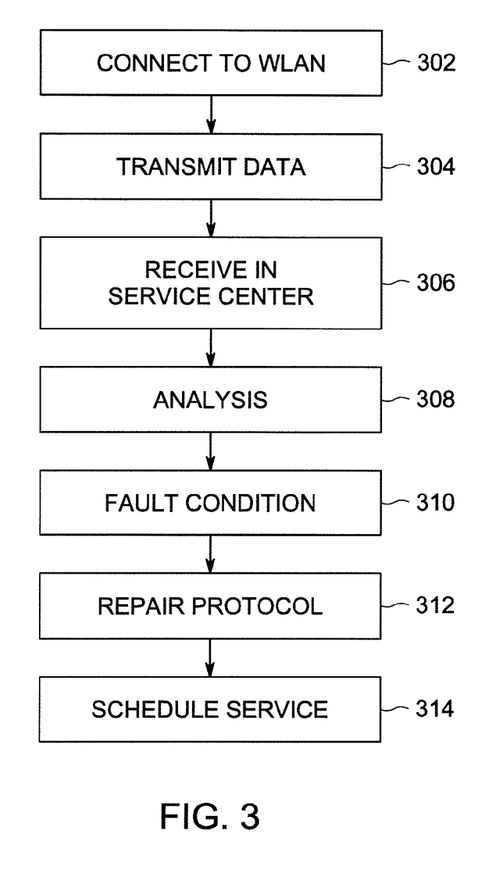
FIG. 3 is a flow chart illustrating one example of a process incorporating aspects of the disclosed embodiments.

FIG. 3 illustrates one example of a process incorporating aspects of the disclosed embodiments. In this example, a user has an appliance 102, such as the refrigerator 202 of FIG. 2, installed in their home. In one embodiment, when the appliance 102 is initially powered on, the appliance 102 automatically connects 302 to the wireless local area network 208 in the user's home 216. Once the appliance 102 is connected, appliance 102 can start to transmit 304 operational data in real time over the Internet 214 to the service center 108.

When the data is received 306 in the service center 108, the data is analyzed 308. If a fault is predicted or detected 310, in one embodiment, a failure or repair protocol can be initiated 312. This can include, for example, scheduling a service call 314 to the home to evaluate the appliance 102 and make any suitable repairs. For example, if the appliance 102 is the refrigerator 202, and the data transmitted from the refrigerator 202 to the service center 108 indicates that refrigerator temperature is out of tolerance, in one embodiment, the service center 108 would automatically initiate a service call.

In one embodiment, one or more combinations of data received by the service center 108 can be used to diagnose a potential problem with the appliance 102. For example, if the temperature of the refrigerator 202 of FIG. 202 is determined to be out of tolerance as noted above, in one embodiment, a diagnosis protocol is initiated. Other data related to the temperature of the refrigerator can be evaluated to identify potential causes of the temperature variation. This data can include, for example compressor run time or door openings. A higher compressor run time without a corresponding drop in temperature could be indicative of a compressor seal failure or other compressor related issue. An excessive number or length of door openings could also be a factor. The results of the evaluation can be transmitted to the repair facility or technician to provide a preliminary diagnosis and aid in the timely repair of the refrigerator. In a situation where the number of door openings or the length of time that the door is open is excessive, perhaps indicating an open door condition, the user could be notified, thus eliminating any need for a service call.

In one embodiment, the time and date stamp of the appliance 102 can be synchronized, with a suitable time keeping provider. For example, using a suitable protocol, such as the network time protocol ("NTP"), a time module or clock 130 (see FIG. 1) of the appliance 102 can be synchronized with the clock of the NTP server. In one embodiment, the time module 130 can be configured to receive a synchronized time setting update from the service center 108. This can be particularly useful in the event of a power interruption, or failure. When the power returns and the appliance 102 begins communicating with the service center 108, the time module 130 of the appliance 102 can be reset and synchronized with the clock of the service center 108.

Figure 4:
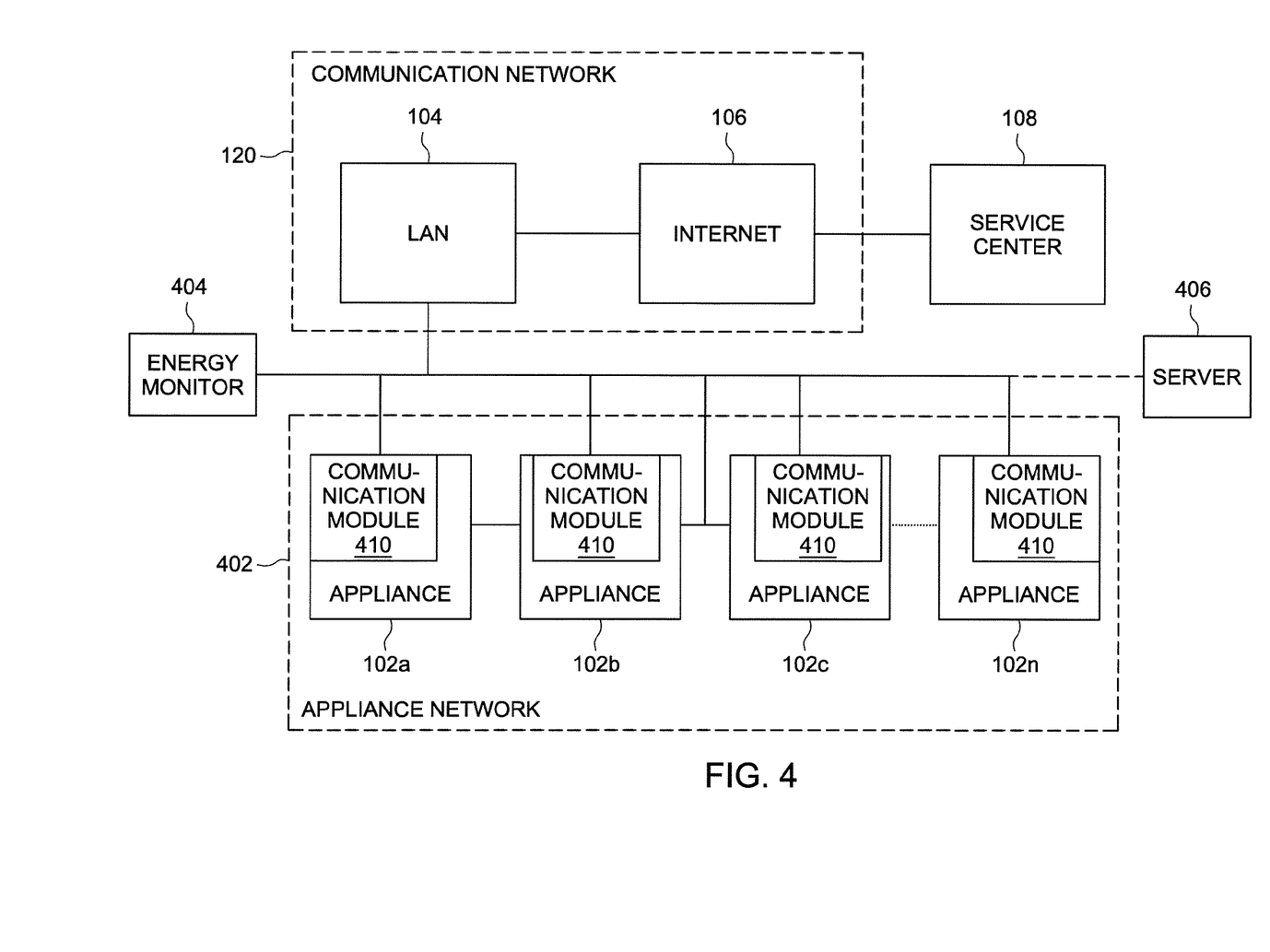
FIG. 4 is a block diagram of another exemplary system incorporating aspects of the disclosed embodiments.

In one embodiment, referring to FIG. 4, where more than one appliance 102a-102n is coupled to the user's local area network 104, a network 402, or local area network of appliances 102a-102n can be formed. Certain actions related to the network 402 of appliances 102a-102n can be monitored and synchronized, such as energy usage, for example. In one embodiment, the network 402 can include an energy synchronization module 404. The energy synchronization module 404 is configured to monitor energy usage and requirements of each appliance 102-102n in the network 402. The energy synchronization module 404 is also configured to synchronize and optimize the energy usage of each appliance 102a-102n in the most efficient manner. Although the energy synchronization module 404 is shown as a standalone module in FIG. 4, in alternate embodiments, the energy synchronization module 404 can be part of the service center 108. As another example, each appliance 102a-102n can include an energy synchronization or communication module 410, where each energy synchronization module 410 is configured to communicate with every other energy synchronization module 410 in order to determine an optimal energy usage pattern of each appliance 102a-102n.

In one embodiment, the local area network 402 of appliances 102a-102n can be coupled to a server 406 that logs data related to each appliance 102a-102n in the network 402. The appliances 102a-102n can communicate with each other and use the data from the server 406 to establish peak operational times for a particular appliance with respect to other appliances.

The aspects of the disclosed embodiments generally provide for real-time monitoring of an appliance using the user's home network and Internet connections. An appliance automatically connects to the user's wireless local area network, which can enable a connection between the appliance 102 and a communication network such as the Internet. Operational data of the appliance is then transmitted over the Internet to a service center. The operational data is collected and evaluated. Failure modes can be identified and service calls automatically initiated in response to an interpretation of the data.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring an appliance, comprising:
automatically establishing a wireless communication connection directly between a communication module in the appliance and a communication network;
monitoring operational data of a component of the appliance against a respective predetermined operational limit of the component; and
only if the operational data exceeds the respective predetermined operational limit, transmitting the operational data in real-time from the appliance to an external monitoring system, during operation of the appliance, over the communication network;
determining a status of the component from the real-time operational data; and
if a failure mode of the component is detected by the external monitoring system, initiating a service protocol corresponding to the component.

2. The method of claim 1, wherein the communication network is the Internet, a WiFi network connection or a cellular communication network.

3. The method of claim 1, wherein the communication module is configured to receive the operational data from the component of the appliance for transmission to the external monitoring system.

4. The method of claim 1, wherein the communication module is configured to poll the component of the appliance for the operational data.

5. The method of claim 1, wherein the component of the appliance is configured to periodically transmit updated operational data to the communication module.

6. The method of claim 1, wherein the appliance is a refrigerator and the operational data of the component corresponds to a run-time of a compressor of the refrigerator, wherein the method further comprises the external monitoring system detecting the run-time of the compressor and determining that a door of the refrigerator is in an open state.

7. The method of claim 1, wherein the component is a compressor and the operational data corresponds to a run time of the compressor.

8. The method of claim 1, further comprising forming a network of appliances, each appliance comprises a connection to the communication network, and using the real-time data from each appliance to synchronize energy usage of each appliance in the network of appliances.

9. The method of claim 1, further comprising synchronizing a time module in the appliance with a time module of the external monitoring system.

10. The method of claim 1, further comprising time stamping the real-time operational data with a time stamp from the external monitoring system.

11. The method of claim 1, further comprising analyzing an operational efficiency of the appliance using the real-time operational data.

12. The method of claim 1, wherein the operational data is sent from the appliance using, a hypertext transfer post protocol.

13. The method of claim 1, wherein determining the status of the component comprises a predictive failure analysis by comparing, a current operational status of the component to a prior operational performance of the component.

14. An appliance monitoring system comprising:
an appliance;
a communication module coupled to the appliance;
a local area network in communicative proximity to the communication module, wherein the communication module is configured to be communicatively coupled to the local area network, the local area network being configured to enable communications from the appliance over the Internet;
a service center communicatively coupled to the local area network via the Internet, the service center being configured to receive real-time operational data from the appliance,
wherein the appliance is in a network of appliances, each appliance in the network of appliances being separately coupled to the local area network by a communication module; and an energy synchronization module in each appliance, each energy synchronization module being configured to communicate with each other energy synchronization module in the network to synchronize energy usage of each appliance in the network of appliances.

15. The system of claim 14, wherein the local area network is a wireless local area network and the communication module coupled to the appliance is a wireless communication controller.

16. The system of claim 14, further comprising a communication link between the communication module and each component of the appliance, wherein the communication module is configured to receive the real-time operational data corresponding to the each component.

17. The system of claim 14, further comprising a time module in the appliance, the time module being configured to receive a synchronized time setting update from the service center.

18. The system of claim 14, further comprising a Voice over Internet Protocol module in the appliance for providing voice communications from the appliance.

* * * * *